(12) United States Patent
Oobayashi (10) Patent No.: US 7,923,502 B2
(45) Date of Patent: Apr. 12, 2011

(54) POLYPROPYLENE-BASED RESIN COMPOSITION AND MOLDING MADE FROM THE SAME

(75) Inventor: Yoshiaki Oobayashi, Kamakura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/219,224

(22) Filed: Jul. 17, 2008

(65) Prior Publication Data
US 2009/0036590 A1 Feb. 5, 2009

(30) Foreign Application Priority Data
Jul. 18, 2007 (JP) ................ P2007-186710

(51) Int. Cl.
*C08K 3/34* (2006.01)
(52) U.S. Cl. .......... 524/450; 524/451; 525/240
(58) Field of Classification Search .......... 524/450, 524/451; 525/240
See application file for complete search history.

(56) References Cited

U.S. PATENT DOCUMENTS

| | | | | |
|---|---|---|---|---|
| 4,296,083 A | * | 10/1981 | Rollmann | 423/708 |
| 5,098,610 A | * | 3/1992 | Okamura et al. | 252/511 |
| 5,677,068 A | * | 10/1997 | Ghirardo et al. | 428/500 |

FOREIGN PATENT DOCUMENTS

| | | |
|---|---|---|
| JP | 8-3381 A | 1/1996 |
| JP | 10-1568 | 1/1998 |
| JP | 410007875 A * | 1/1998 |
| JP | 11-140331 A | 5/1999 |
| JP | 2000-297221 A | 10/2000 |
| JP | 2006-257404 A | 9/2006 |
| WO | WO-00/69930 A1 | 11/2000 |
| WO | WO-2004/037916 A2 | 5/2004 |
| WO | WO-2007/029924 A1 | 3/2007 |

OTHER PUBLICATIONS

Examination Report issued by the Australian Patent Office on Aug. 7, 2009 in corresponding Singapore Application No. SG 200805609-5.
English translation of JP 10-007875 A published Jan. 13, 1998.

* cited by examiner

*Primary Examiner* — Robert D. Harlan
(74) *Attorney, Agent, or Firm* — Birch, Stewart, Kolasch & Birch, LLP (57) ABSTRACT

An object of the present invention is to provide a polypropylene-based resin composition which is excellent in mechanical characteristics and molding processability, and is also capable of suppressing emission of a volatile organic compound.

Disclosed is a polypropylene-based resin composition comprising a propylene-based block copolymer (A) which satisfies features (a), (b) and (c) shown below, and a zeolite (B) having a molar ratio $SiO_2/Al_2O_3$ of 10 to 60 in an amount of 0.01 to 0.4 part by weight based on 100 parts by weight of the propylene-based block copolymer (A):

Feature (a): the propylene-based block copolymer (A) is a propylene-based block copolymer containing a polymer component (I) and a polymer component (II);

Feature (b): the polymer component (II) has a content of the units derived from at least one kind of comonomer selected from the group consisting of ethylene and α-olefins having 4 to 12 carbon atoms of from 1 to 80% by weight; and Feature (c): the propylene-based block copolymer (A) has a content of the polymer component (II) of from 5 to 70% by weight.

15 Claims, 1 Drawing Sheet

Fig.1

POLYPROPYLENE-BASED RESIN COMPOSITION AND MOLDING MADE FROM THE SAME

BACKGROUND OF THE INVENTION

1. Field of the Invention

This application was filed claiming Paris Convention priority of Japanese Patent Application No. 2007-186710, the entire content of which is herein incorporated by reference.

The present invention relates to a polypropylene-based resin composition and a molding made from the same. More particularly, the present invention relates to a polypropylene-based resin composition which is less likely to emit a volatile organic compound contained therein to the outside, and is also excellent in tensile strength, impact strength and molding processability, and to a molding made from the same.

2. Description of the Related Art

Among thermoplastic resins, a polypropylene-based resin is a typical resin which is inexpensive and is lightweight, and is also excellent in characteristics such as molding processability, mechanical characteristics, heat resistance, long-term heat degradation resistance, and are therefore widely used in applications, for example, various containers, food packaging materials, caps of containers such as bottles, stationery, daily necessities, fibers for carpets and sofas, automotive interior/exterior materials, household appliance materials, and building materials such as interior materials of buildings and houses. Since there is a fear for a sickhouse (indoor air pollution) problem with building materials such as interior materials of buildings and houses, it has recently been required to decrease volatile organic compounds (VOC), which are reported as causative substances of the sickhouse problem, for a resin material to be used. Specific measures have been studied about thirteen kinds of VOC including formaldehyde. The sickhouse problem is considered as the objective substance in not only building materials but also interior materials of vehicles such as automobiles, and the use of resin materials containing less VOC is required.

For example, Japanese Unexamined Patent Publication (Kokai) No. 8-3381 discloses a polyolefin-based composition comprising a polyolefin, a lubricant, and a zeolite which has a specific molar ratio Si/Al, an average particle diameter and water adsorption properties and is also represented by a specific formula. The publication describes that a container cap made from the composition does not cause deterioration of taste or smell of foods in the container.

Japanese Unexamined Patent Publication (Kokai) No. 10-1568 discloses a polyolefin-based composition comprising a polyolefin, and one or more kinds of adsorptive inorganic substances selected from the group consisting of an inorganic filler, a zeolite, a fraipontite-silica composite and a hydrotalcite. The publication describes that the composition is less likely to cause generation of an unpleasant odor under heating and gives a molding having excellent heat fading resistance, and such a molding is suited for use as a food packaging container.

Japanese Unexamined Patent Publication (Kokai) No. 11-140331 discloses a synthetic resin composition comprising a synthetic resin component and an artificial zeolite. The publication describes that generation of a harmful gas such as a hydrogen chloride gas is suppressed upon incineration of products made from the composition, and also high combustion efficiency enables less generation of residual ash.

Japanese Unexamined Patent Publication (Kokai) No. 2000-297221 discloses a synthetic resin composition comprising a synthetic resin component and an alkali earth metal type synthetic zeolite, and a product produced therefrom. The publication describes that generation of a harmful gas such as hydrogen chloride or dioxin is suppressed when products made from the composition are incinerated.

Japanese Unexamined Patent Publication (Kokai) No. 2006-257404 discloses a low-odor resin composition comprising a thermoplastic resin and a hydrophobic silica aluminosilicate having a specific molar ratio $SiO_2/Al_2O_3$. The publication describes that various original characteristics of the thermoplastic resin in the composition are not impaired and generation of an odor during melt-kneading for preparation of the composition, heating at high temperature in molding processing, storage of the molding at high temperature or on use is remarkably reduced, and also the molding is excellent in appearance.

However, from the viewpoint of environmental protection, it is required to decrease emission of VOC from the resin compositions described in the aforementioned publications and the products made from the compositions, especially aldehydes.

SUMMARY OF THE INVENTION

Under these circumstances, an object of the present invention is to provide a polypropylene-based resin molding which is capable of suppressing emission of VOC and is also excellent in tensile strength, and a polypropylene-based resin composition which is suited for use as a material of such a molding and is capable of suppressing emission of VOC, and is also excellent in tensile strength, impact strength and molding processability.

The present invention relates to a polypropylene-based resin composition comprising a propylene-based block copolymer (A) which satisfies features (a), (b) and (c) shown below, and a zeolite (B) having a molar ratio $SiO_2/Al_2O_3$ of 10 to 60 in an amount of 0.01 to 0.4 part by weight based on 100 parts by weight of the propylene-based block copolymer (A):

Feature (a): the propylene-based block copolymer (A) is a propylene-based block copolymer containing a polymer component (I) and a polymer component (II), wherein the polymer component (I) is a propylene-based polymer having an intrinsic viscosity ($[\eta]_I$) measured in tetralin at 135° C. of 0.1 to 1.5 (dl/g), and the polymer component (II) is a propylene-based copolymer having units derived from at least one kind of comonomer selected from the group consisting of ethylene and α-olefins having 4 to 12 carbon atoms and units derived from propylene, which copolymer has an intrinsic viscosity ($[\eta]_{II}$) measured in tetralin at 135° C. of 1 to 20 (dl/g);

Feature (b): the polymer component (II) has a content of the units derived from at least one kind of comonomer selected from the group consisting of ethylene and α-olefins having 4 to 12 carbon atoms of from 1 to 80% by weight; and Feature (c): the propylene-based block copolymer (A) has a content of the polymer component (II) of from 5 to 70% by weight.

DETAILED DESCRIPTION OF THE INVENTION

The propylene-based block copolymer (A) is a propylene-based block copolymer which satisfies the following features (a), (b) and (c).

Feature (a): the propylene-based block copolymer (A) is a propylene-based block copolymer containing a polymer component (I) and a polymer component (II), wherein the polymer component (I) is a propylene-based polymer having an intrinsic viscosity ($[\eta]_I$) measured in tetralin at 135° C. of 0.1 to 1.5 (dl/g), and the polymer component (II) is a propylene-based copolymer having units derived from at least one kind of comonomer selected from the group consisting of ethylene and α-olefins having 4 to 12 carbon atoms and units derived from propylene, which copolymer has an intrinsic viscosity ($[\eta]_{II}$) measured in tetralin at 135° C. of 1 to 20 (dl/g);

Feature (b): the polymer component (II) has a content of the units derived from at least one kind of comonomer selected from the group consisting of ethylene and α-olefins having 4 to 12 carbon atoms of from 1 to 80% by weight; and Feature (c): the propylene-based block copolymer (A) has a content of the polymer component (II) of from 5 to 70% by weight.

The polymer component (I) is typically a propylene homopolymer component, or a propylene-based copolymer component composed of units derived mainly from propylene. When the polymer component (I) is the propylene-based copolymer component, the polymer component (I) is a propylene-based copolymer component comprising units derived from at least one kind of comonomer selected from the group consisting of ethylene and α-olefins having 4 to 12 carbon atoms, and units derived from propylene.

When the polymer component (I) is a propylene-based copolymer component composed of units derived mainly from propylene, the content of the units derived from at least one kind of comonomer selected from the group consisting of ethylene and α-olefins having 4 to 12 carbon atoms of the polymer component (I) is from 0.01 to 30% by weight.

Examples of the α-olefins having 4 to 12 carbon atoms include 1-butene, 1-pentene, 1-hexene, 4-methyl-1-pentene, 1-octene, and 1-decene, and 1-butene, 1-hexene, and 1-octene are preferred.

Examples of the propylene-based copolymer component composed of units derived mainly from propylene as the polymer component (I) include a propylene-ethylene copolymer component, a propylene-1-butene copolymer component, a propylene-1-hexene copolymer component, a propylene-ethylene-1-butene copolymer component, a propylene-ethylene-1-hexene copolymer component, a propylene-ethylene-1-octene copolymer component, and a propylene-1-octene copolymer component.

The polymer component (II) is a propylene-based copolymer having units derived from at least one kind of comonomer selected from the group consisting of ethylene and α-olefins having 4 to 12 carbon atoms, and units derived from propylene.

The content of the units derived from at least one kind of comonomer selected from the group consisting of ethylene and α-olefins having 4 to 12 carbon atoms of the polymer component (II) is from 1 to 80% by weight, preferably from 20 to 70% by weight, and more preferably from 30 to 60% by weight.

Examples of the α-olefins having 4 to 12 carbon atoms in the polymer component (II) are the same as the examples of the α-olefins having 4 to 12 carbon atoms in the polymer component (I). Examples of the polymer component (II) include a propylene-ethylene copolymer component, a propylene-ethylene-1-butene copolymer component, a propylene-ethylene-1-hexene copolymer component, a propylene-1-butene copolymer component, and a propylene-1-hexene copolymer component.

Examples of the propylene-based block copolymer (A) in the present invention include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, a (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer, and a (propylene-1-butene)-(propylene-1-hexene) copolymer.

The content of the polymer component (II) of the propylene-based block copolymer (A) is from 5 to 70% by weight, preferably from 5 to 50% by weight, more preferably from 10 to 50% by weight, and still more preferably from 15 to 40% by weight.

The propylene-based block copolymer (A) is preferably a block copolymer in which the polymer component (I) is a homopolymer component of propylene, and the polymer component (II) is a propylene-based copolymer component having units derived from at least one kind of comonomer selected from the group consisting of ethylene and α-olefins having 4 to 12 carbon atoms and units derived from propylene. The propylene-based block copolymer (A) is more preferably a block copolymer in which the polymer component (I) is a homopolymer component of propylene, and the polymer component (II) is a copolymer component of propylene and ethylene, the content of the polymer component (II) is from 5 to 50% by weight, and the content of the units derived from ethylene contained in the polymer component (II) is from 20 to 70% by weight.

The intrinsic viscosity $[\eta]_I$ of the polymer component (I) is from 0.1 to 1.5 dl/g, preferably from 0.3 to 1.5 dl/g, and more preferably from 0.5 to 1.5 dl/g. When $[\eta]_I$ is more than 1.5 dl/g, tensile strength, impact strength or molding processability of the resultant polypropylene-based resin composition may deteriorate. In contrast, when $[\eta]_I$ is less than 0.1 dl/g, molding processability may be insufficient, or emission of VOC from a product may increase.

The intrinsic viscosity $[\eta]_{II}$ of the polymer component (II) is from 1 to 20 dl/g, preferably from 1 to 15 dl/g, more preferably from 2 to 10 dl/g, and still more preferably from 3 to 7 dl/g. When $[\eta]_{II}$ is more than 20 dl/g, tensile strength, impact strength or molding processability of the resultant polypropylene-based resin composition may deteriorate. In contrast, when $[\eta]_{II}$ is less than 1 dl/g, molding processability may be insufficient.

The ratio of $[\eta]_{II}$ to $[\eta]_I$ is preferably from 1 to 20, more preferably from 2 to 10, and still more preferably from 3 to 8.

The intrinsic viscosity is measured at a temperature of 135° C. by the following method using tetralin as a solvent.

Using an Ubbelohde type viscometer, a reduced viscosity is measured at three concentrations, 0.1, 0.2 and 0.5 g/dl. The intrinsic viscosity is determined by a calculation method described in "Polymer Solution, Polymer Experiments 11 (Kobunshi Yoeki, Kobunshi Jikkengaku 11)" (published in 1982 by KYORITSU SHUPPAN CO., LTD.), page 491, that is, an extrapolation method in which the reduced viscosity is plotted versus the concentration and the concentration is extrapolated to zero. A polymer powder collected from a polymerization tank, or a pellet made from the same is used as a sample. In the case of the polymer component (I), the measurement is conducted using a polymer powder extracted from a polymerization tank of a first stage.

When the propylene-based block copolymer (A) is a copolymer in which the polymer component (I) is obtained in a polymerization step of a first stage and the polymer component (II) is obtained in a step of a second stage to be conducted after the first stage, the contents of the polymer component (I) and the polymer component (II), and the measurement and calculation of the intrinsic viscosity ($[\eta]_{Total}$, $[\eta]_I$, $[\eta]_{II}$) are as follows. $[\eta]_{Total}$ shows the intrinsic viscosity of the propylene-based block copolymer (A).

From the intrinsic viscosity $[\eta]_I$ of the polymer component (I) produced in the polymerization step of the first stage, the intrinsic viscosity $[\eta]_{Total}$ of the final polymer (that is, propylene-based block copolymer (A)) produced through both polymerization steps of the first and second stages, and the weight ratios of the polymer component (I) and the polymer component (II) contained in the final polymer, the intrinsic viscosity $[\eta]_{II}$ of the polymer component (II) is calculated by the following equation.

$$[\eta]_{II}=([\eta]_{Total}-[\eta]_I \times X_I)/X_{II}$$

where $[\eta]_{Total}$: intrinsic viscosity (dl/g) of final polymer
$[\eta]_I$: intrinsic viscosity (dl/g) of polymer powder collected after polymerization step of first stage
$X_I$: weight ratio of polymer component (I) produced in polymerization step of first stage
$X_{II}$: weight ratio of polymer component (II) produced in polymerization step of second stage $X_I$ and $X_{II}$ are determined from the material balance upon polymerization.

From the viewpoint of high crystallinity and high rigidity of a block copolymer, the isotactic pentad fraction (mmmm fraction) measured by $^{13}$C-NMR of the polymer component (I) contained in the propylene-based block copolymer (A) is preferably 0.960 or more, and more preferably 0.980 or more.

The isotactic pentad fraction means a fraction of propylene monomer units existing in the center of the chains composed of five propylene units meso-bonded successively among the pentad units in the polypropylene molecule, and is determined by the $^{13}$C-NMR method described in the method (Macromolecules, Vol. 6, pp. 925, 1973) reported by A. Zambelli et al. Assignment of a $^{13}$C-NMR absorption peak is conducted based on Macromolecules, Vol. 8, pp. 687 (1975).

From the viewpoint of crystallinity and tensile strength of the propylene-based block copolymer, when the polymer component (I) of the propylene-based block copolymer (A) is a propylene-based copolymer component composed of units derived mainly from propylene, the content of a 20° C. xylene-soluble fraction of the polymer component (I) (hereinafter referred to as CXS(I)) is preferably less than 1.0% by weight, more preferably 0.8% by weight or less, and still more preferably 0.5% by weight or less.

The propylene-based block copolymer (A) can be produced by a known polymerization method using a known polymerization catalyst.

Examples of the polymerization catalyst include a Ziegler catalyst, a Ziegler-Natta catalyst, a cyclopentadienyl ring-containing catalyst comprising a compound of a transition metal of Group 4 of the Periodic Table and alkyl aluminoxane, a cyclopentadienyl ring-containing catalyst comprising a compound of a transition metal of Group 4 of the Periodic Table, a compound capable of reacting with the compound to form an ionic complex, and an organoaluminum compound, and a catalyst obtained by treating a catalyst component in the presence of particles of an inorganic substance. A prepolymerization catalyst prepared by prepolymerizing ethylene or α-olefin in the presence of the above catalyst may be used.

Examples of the catalyst include catalysts described in Japanese Unexamined Patent Publication (Kokai) Nos. 61-218606, 5-194685, 7-216017, 10-212319, 2004-182981, and 9-316147.

Examples of the polymerization method include bulk polymerization, solution polymerization, slurry polymerization, and vapor phase polymerization. The bulk polymerization is a method of performing polymerization at a polymerization temperature using a liquid olefin as a medium, the solution polymerization and the slurry polymerization are methods of performing polymerization in an inert hydrocarbon solvent such as propane, butane, isobutane, pentane, hexane, heptane, or octane, and the vapor phase polymerization is a method of polymerizing monomers in a gas state as a medium. These polymerization methods may be conducted either batchwise or continuously, or these polymerization methods may be appropriately used in combination. From industrial and economical points of view, a continuous vapor phase polymerization method, and a bulk-vapor phase polymerization method composed of bulk polymerization and vapor phase polymerization performed successively are preferred.

The method for producing a propylene-based block copolymer (A) is a method for producing a propylene-based block copolymer in multi-stages of at least two-stages. Preferably, the method is a method having at least two stages, for example, a stage of producing a polymer component (I) and a stage of producing a polymer component (II).

Examples of the multi-stage method include multi-stage polymerization methods described in Japanese Unexamined Patent Publication (Kokai) Nos. 5-194685 and 2002-12719.

Various conditions (polymerization temperature, polymerization pressure, monomer concentration, introduction amount of catalyst, polymerization time, etc.) in the polymerization step may be appropriately decided according to the structure and characteristics (contents of the polymer component (I) and polymer component (II), the intrinsic viscosity $[\eta]_I$, the intrinsic viscosity $[\eta]_{II}$, and the content of the units derived from at least one kind of comonomer selected from the group consisting of ethylene and α-olefins having 4 to 12 carbon atoms contained in the polymer components (I) and (II), etc.) of the desired propylene-based block copolymer.

In the production of the polypropylene-based block copolymer (A), in order to remove a residual solvent contained in the propylene-based block copolymer (A) and an ultra-low molecular weight oligomer as by-products produced upon production, the propylene-based block copolymer (A) may be optionally dried at a temperature lower than the temperature at which the propylene-based block copolymer (A) is melted. This operation also has the effect of decreasing the emission amount of VOC. There is no restriction on the shape of the polypropylene-based resin upon drying and the polypropylene-based resin may be in the form of a powder or pellets. Examples of the drying method include the methods described in Japanese Unexamined Patent Publication (Kokai) No. 55-75410 and Japanese Patent No. 2,565,753.

There is no restriction on the melt flow rate (MFR) measured at a temperature of 230° C. and a load of 2.16 kgf of the propylene-based block copolymer (A) used in the present invention. From the viewpoint of molding processability, the melt flow rate is usually from 0.1 to 400 g/10 min., preferably from 3 to 300 g/10 min., more preferably from 5 to 200 g/10 min., and still more preferably from 5 to 100 g/10 min.

The zeolite (B) used in the present invention is a crystalline aluminosilicate having a three-dimensional framework structure and the molar ratio $SiO_2/Al_2O_3$ of the zeolite is from 10 to 60. Examples thereof include a zeolite having a crystalline structure called Y type and a zeolite having a crystalline structure called ZSM-5 type (or MFI type).

From the viewpoint of efficiency of trapping VOC such as aldehydes, the zeolite (B) is preferably a zeolite represented by the formula (I): $xM_2/nO\cdot Al_2O_3\cdot ySiO_2\cdot zH_2O$ wherein M represents an element of Group IA or IIA of the Periodic Table, n represents an atomic value of M, x represents a number more than 0, y is a number of 20 to 60, and z represents the number of crystal water of the zeolite within a range from 0 to 7. The zeolite (B) is more preferably a zeolite represented by the formula (I) in which y is within a range from 20 to 50, and still more preferably a zeolite represented by the formula (II):

$$xNa_2O\cdot Al_2O_3\cdot ySiO_2\cdot zH_2O$$

wherein x is within a range from 0 to 1, y is within a range from 20 to 50, and z represents the number of crystal water of the zeolite within a range from 0 to 7.

The crystalline structure of the zeolite is preferably a crystalline structure called ZSM-5 type (or MFI type).

The zeolite (B) usually comprises particles with particle diameter distribution. There is no restriction on the particle diameter in which accumulation of particle diameter distribution measured on a volume basis of the zeolite (B) is 50% (hereinafter referred to as a "D50 particle diameter"). The D50 particle diameter determined by a laser diffraction particle diameter distribution analyzing method is usually from 0.01 to 50 μm, and the proportion of particles having a particle diameter of 10 μm or more is usually less than 30% by weight. The laser diffraction particle diameter distribution analyzing method is a method of measuring particle diameter distribution of the powder using a laser diffraction particle diameter distribution analyzer. In the measurement, pure water is used as a dispersive medium of the zeolite. The particle diameter distribution and the D50 particle diameter of the zeolite (B) used in the present invention are values measured in pure water using a laser diffraction particle diameter distribution analyzer "SALD-2100" manufactured by Shimadzu Corporation.

The zeolite (B) is preferably a zeolite comprising particles having a D50 particle diameter of 0.1 to 20 μm and the proportion of particles having a particle diameter of 10 μm or more is less than 10% by weight. The D50 particle diameter of the zeolite (B) is more preferably from 0.1 to 10 μm, and still more preferably from 0.1 to 5 μm.

From the viewpoint of production cost and handing properties, a zeolite having a D50 particle diameter of less than 0.1 μm is disadvantageous, while a zeolite having a D50 particle diameter of more than 20 μm is disadvantageous since it is inferior in dispersibility in the propylene-based block copolymer (A), and thus mechanical characteristics of a polypropylene-based resin composition containing the same may deteriorate and passing properties of a filter may deteriorate in the production of a polypropylene-based resin composition described hereinafter.

The amount of the zeolite (B) to be mixed with 100 parts by weight of the propylene-based block copolymer (A) is within a range from 0.01 to 0.4 part by weight, preferably from 0.01 to 0.3 part by weight, and still more preferably from 0.02 to 0.2 part by weight. When the amount of the zeolite (B) is less than 0.01 part by weight, insufficient effect of trapping VOC (especially aldehydes) in the polypropylene-based resin composition is exerted. In contrast, when the amount of the zeolite (B) is more than 0.4 part by weight, the polypropylene-based resin composition may cause yellowing.

From the viewpoint of molding processability, the MFR measured at a temperature of 230° C. and a load of 2.16 kgf of the polypropylene-based resin composition of the present invention is preferably from 5 to 400 g/10 min., more preferably from 5 to 300 g/10 min., and still more preferably from 5 to 200 g/10 min.

The MFR of the resultant polypropylene-based resin composition may be adjusted by mixing with an organic peroxide in the melt-kneading step when the polypropylene-based resin composition of the present invention is prepared by melt-kneading raw materials.

Examples of the organic peroxide include alkyl peroxides, diacyl peroxides, peroxyesters, and peroxydicarbonates. Examples of the alkyl peroxides include dicumyl peroxide, di-t-butyl peroxide, t-butylcumyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, and 3,6,9-triethyl-3,6,9-trimethyl-1,4,7-triperoxonane.

Examples of the diacyl peroxides include benzoyl peroxide, lauroyl peroxide, and decanoyl peroxide. Examples of the peroxyesters include 1,1,3,3-tetramethylbutylperoxy neodecanoate, α-cumylperoxy neodecanoate, t-butylperoxy neodecanoate, t-butylperoxy neoheptanoate, t-butylperoxy pivalate, t-hexylperoxy pivalate, 1,1,3,3-tetramethylbutylperoxy-2-ethyl hexanoate, t-amylperoxyl-2-ethyl hexanoate, t-butyl peroxy-2-ethyl hexanoate, t-butylperoxy isobutyrate, di-t-butyl peroxyhexahydroterephthalate, t-amyl peroxy-3,5,5-trimethylhexanoate, t-butyl peroxy-3,5,5-trimethylhexanoate, t-butyl peroxyacetate, t-butyl peroxybenzoate, and di-t-butyl peroxytrimethyladipate.

Examples of the peroxydicarbonates include di-3-methoxybutyl peroxydicarbonate, di(2-ethylhexyl)peroxydicarbonate, diisopropyl peroxycarbonate, t-butylperoxy isopropylcarbonate, di(4-t-butylcyclohexyl)peroxydicarbonate, dicetyl peroxydicarbonate, and dimyristyl peroxydicarbonate.

The organic peroxide is preferably an alkyl peroxide, and particularly preferably 2,5-dimethyl-2,5-di(t-butylperoxy)hexane, 1,3-bis(t-butylperoxyisopropyl)benzene, or 3,6,9-triethyl-3,6,9-trimethyl-1,4,7-triperoxonane.

The used amount of the organic peroxide is usually from 0.0001 part by weight to 1 part by weight, preferably from 0.0005 to 0.5 part by weight, and more preferably from 0.001 to 0.3 part by weight, based on 100 parts by weight of the propylene-based block copolymer (A). When the amount of the organic peroxide is excessively large, the emission amount of VOC may increase, while processability of the polypropylene-based resin composition is somewhat improved. Therefore, it is preferred to adjust the amount according to the purposes.

The organic peroxide may be used in the form of an impregnated powder (masterbatch) obtained by impregnating a powder of the propylene-based block copolymer (A) therewith. There is no restriction on the weight-average particle diameter of the powder. From the viewpoint of dispersibility of the organic peroxide in the propylene-based block copolymer (A) upon melt-mixing, the weight-average particle diameter is usually within a range from 100 to 2,000 μm. There is no restriction on the impregnation amount of the organic peroxide. From the viewpoint of easy handling, the impregnation amount of the organic peroxide is usually within a range from 1 to 50% by weight, and preferably from 5 to 20% by weight.

The polypropylene-based resin composition of the present invention can be produced, for example, by melt-mixing a propylene-based block copolymer (A) with a zeolite (B) having a molar ratio $SiO_2/Al_2O_3$ of 10 to 60 in an amount of 0.01 to 0.4 part by weight based on 100 parts by weight of the propylene-based block copolymer (A) at a temperature of 180° C. or higher and filtering the resultant molten mixture through a filter.

From the viewpoint of production stability upon production of the polypropylene-based resin composition and appearance of the molding made from the polypropylene-based resin composition, the opening size of a filter used for producing the polypropylene-based resin composition of the present invention is preferably from 30 to 400 μm, more preferably from 30 to 300 μm, and still more preferably from 50 to 150 μm.

The opening size of the filter is the size of pores through which the polypropylene-based resin composition comprising a propylene-based block copolymer (A) and a zeolite (B) can pass, and is the value measured, as the particle diameter (μm) of maximum glass beads passed through a filter media, by the method defined in JIS B8356. The opening size of a filter serves as an indicator of filtration accuracy of the filter.

The material of the filter may be either metal or resin, and is preferably stainless steel, for example, SUS304, SUS316, or SUS316L.

From the viewpoint of easy handling, the shape of the filter is preferably a disk-like shape (circle, crescent, ellipse, doughnut, square, etc.), or a cylindrical shape.

Examples of the filter include a woven wire mesh, a crimp wire mesh, a welded wire mesh, a demister, a spiral wire mesh, a laminated metal filter, and a metal sintered filter. Examples of the woven wire mesh include a plane woven wire mesh, a twill woven wire mesh, a satin woven wire mesh, a plain mat woven wire mesh, and a twill mat woven wire mesh. The metal sintered filter includes a filter produced by sintering a stainless steel (SUS316L) fiber of a micron order. The filter is preferably a metal sintered filter.

Plural filters may be arranged in parallel or in series in the passing direction of the resin. When plural filters are arranged in parallel, plural filters may be arranged in a single row.

The polypropylene-based resin composition of the present invention may contain one or more kinds of additives. Examples of the additives include neutralizers, antioxidants, ultraviolet absorbers, photostabilizers, nucleating agents, antistatic agents, lubricants, anti-blocking agents, processing aids, colorants, blowing agents, antibacterial agents, plasticizers, flame retardants, crosslinking agents, auxiliary crosslinking agents, and brightening agents.

Among such additives, an antioxidant is preferably used. In the present invention, the use of the antioxidant is highly effective so as to suppress an increase in the emission amount of VOC of the polypropylene-based resin composition and to improve molding processability and long-term heat degradation resistance. Examples of the applicable antioxidant include a phenol-based antioxidant, a phosphorous-based antioxidant, a sulfur-based antioxidant, and a hydroxyl amine-based antioxidant.

It is preferred to use the phenol-based antioxidant or the phosphorous-based antioxidant, and it is more preferred to use the phenol-based antioxidant in combination with the phosphorous-based antioxidant.

Examples of the phenol-based antioxidants include 2,6-di-t-butyl-4-methylphenol, tetrakis[methylene-3(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5-5]undecane, 1,3,5-tris2[3(3,5-di-t-butyl-4-hydroxyphenyl)propionyloxy] ethylisocyanate, 1,3,5-trimethyl-2,4,6-tris(3,5-di-t-butyl-4-hydroxybenzyl)benzene, tris(3,5-di-t-butyl-4-hydroxybenzyl)isocyanurate, 1,3,5-tris(4-t-butyl-3-hydroxy-2,6-dimethylbenzyl)isocyanurate, pentaerythrityl-tetrakis[3-(3,5-di-t-butyl-4-hydroxyphenyl)propionate], triethylene glycol-N-bis-3-(3-t-butyl-5-methyl-4-hydroxyphenyl)propionate, 1,6-hexanediolbis[3-(3,5-di-t-butyl-4-hydroxyphenyl)propionate], 2,2-thiobis-diethylenebis[3-(3,5-di-t-butyl-4-hydroxyphenyl)propionate], 2,2'-methylene-bis-(4-methyl-6-t-butylphenol), 2,2'-methylene-bis-(4-ethyl-6-t-butylphenol), 2,2'-methylene-bis-(4,6-di-t-butylphenol), 2,2'-ethylidene-bis-(4,6-di-t-butylphenol), 2,2'-butylidene-bis-(4-methyl-6-t-butylphenol), 4,4'-butylidenebis(3-methyl-6-t-butylphenol), 2-t-butyl-6-(3-t-butyl-2-hydroxy-5-methylbenzyl)-4-methylphenylacrylate, 2,4-di-t-amyl-6-(1-(3,5-di-t-amyl-2-hydroxyphenyl)ethyl)phenylacrylate, and tocopherols. Examples of the tocopherols include vitamin E as α-tocopherol.

Among such antioxidants, a phenol-based antioxidant having a molecular weight of 300 or more is preferably used so as to improve molding processability and heat degradation resistance of the polypropylene-based resin composition. Examples of the antioxidant include tetrakis[methylene-3(3',5'di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethylene glycol-N-bis-3-(3-t-butyl-5-methyl-4-hydroxyphenyl)propionate, 1,6-hexanediolbis[3-(3,5-di-t-butyl-4-hydroxyphenyl)propionate], and 2,2-thiobis-diethylenebis[3-(3,5-di-t-butyl-4-hydroxyphenyl)propionate].

3,9-bis[2-{3-(3-t-butyl-4-hydroxy-5-methylphenyl)propionyloxy}-1,1-dimethylethyl]-2,4,8,10-tetraoxaspiro[5-5] undecane can be preferably used so as to obtain a resin composition having excellent color hue stability.

The used amount of the phenol-based antioxidant is usually from 0.01 part by weight to 1 part by weight, preferably from 0.01 to 0.5 part by weight, and still more preferably from 0.05 to 0.3 part by weight, based on 100 parts by weight of the polypropylene-based resin (A).

Examples of the phosphorous-based antioxidants include tris(nonylphenyl)phosphite, tris(2,4-di-t-butylphenyl)phosphite, distearylpentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-di-t-butylphenyl)-4,4'-diphenylene diphosphonite, 2,2'-methylenebis(4,6-di-t-butylphenyl) 2-ethylhexyl phosphite, 2,2'-ethylidenebis(4,6-di-t-butylphenyl)fluorophosphite, bis (2,4-di-t-butyl-6-methylphenyl)ethylphosphite, 2-(2,4,6-tri-t-butylphenyl)-5-ethyl-5-butyl-1,3,2-oxaphosphorinane, 2,2',2''-nitriro[triethyl-tris(3,3',5,5'-tetra-t-butyl-1,1'-biphenyl-2,2'-diyl)phosphite, and 2,4,8,10-tetra-t-butyl-6-[3-(3-methyl-4-hydroxy-5-t-butylphenyl)propoxy]dibenzo[d,f][1,3,2]dioxaphosphepine.

A phosphorous-based antioxidant having a molecular weight of 300 or more is preferably used so as to improve molding processability and heat degradation resistance of the polypropylene-based resin composition. Examples of the antioxidant include tris(2,4-di-t-butylphenyl)phosphite, bis(2,4-di-t-butylphenyl)pentaerythritol diphosphite, bis(2,4-di-t-butyl-6-methylphenyl)pentaerythritol diphosphite, bis (2,6-di-t-butyl-4-methylphenyl)pentaerythritol diphosphite, and 2,4,8,10-tetra-t-butyl-6-[3-(3-methyl-4-hydroxy-5-t-butylphenyl)propoxy]dibenzo[d,f][1,3,2]dioxaphosphepine.

The used amount of the phosphorous-based antioxidant is usually from 0.01 to 1 part by weight, preferably from 0.01 to 0.5 part by weight, and still more preferably from 0.05 to 0.3 part by weight, based on 100 parts by weight of the polypropylene-based resin (A).

In one preferred aspect, the polypropylene-based resin composition of the present invention contains a phenol-based antioxidant having a molecular weight of 300 or more and/or a phosphorous-based antioxidant having a molecular weight of 300 or more in an amount of 0.01 to 1 part by weight based on 100 parts by weight of the propylene-based block copolymer (A).

The polypropylene-based resin composition of the present invention may contain one or more kinds of resins or rubbers other than the propylene-based block copolymer (A).

Examples of the additional resin or rubber include high-density polyethylene (HDPE), low-density polyethylene (LDPE), ethylene/α-olefin-based copolymer (L-LDPE or elastomer), polystyrenes (for example, polystyrene, poly(p-methylstyrene), poly(α-methylstyrene), AS (acrylonitrile/styrene copolymerized) resin, ABS (acrylonitrile/butadiene/styrene copolymerized) resin, AAS (special acrylic rubber/acrylonitrile/styrene copolymerized) resin, ACS (acrylonitrile/polyethylene chloride/styrene copolymerized) resin, polychloroprene, chlorinated rubber, polyvinyl chloride, polyvinylidene chloride, acrylic resin, ethylene/vinyl alcohol copolymerized resin, fluorine resin, polyacetal, grafted polyphenylene ether resin and polyphenylene sulfide resin, polyurethane, polyamide, polyester resins (for example, polyethylene terephthalate, polybutylene terephthalate), polycarbonate, polysulfone, polyether ether ketone, polyethersulfone, thermoplastic resins such as aromatic polyester resin, epoxy resin, diallyl phthalate prepolymer, silicone resin, silicone rubber, polybutadiene, 1,2-polybutadiene, polyisoprene, styrene/butadiene copolymer, butadiene/acrylonitrile copolymer, epichlorohydrin rubber, acrylic rubber, and natural rubber.

As the additional resin or rubber, an elastomer comprising a low-density polyethylene (LDPE) and an ethylene-α-olefin-based copolymer is usually used. Examples of the elastomer comprising an ethylene-α-olefin-based copolymer include an elastomer comprising an ethylene-butene-1 copolymer, an ethylene-hexene-1 copolymer and an ethylene-octene-1 copolymer, and an elastomer produced by using a homogeneous catalyst such as a metallocene-based catalyst.

The content of the α-olefin in the copolymer is usually from 5 to 50% by weight, and the MFR measured at 190° C. of the ethylene-α-olefin-based elastomer is usually from 0.05 to 50 g/10 min.

Examples of the method of mixing the resin or rubber other than the propylene-based block copolymer (A) include a method of mixing pellets of a preliminarily melt-kneaded polypropylene-based resin composition, and a method of simultaneously mixing a propylene-based block copolymer (A), a zeolite (B) and an optionally added additive in the stage of producing a polypropylene-based resin composition.

The polypropylene-based resin composition produced by the production method of the present invention may contain a filler (other than the zeolite (B)).

Examples of the method of mixing the filler include a method of mixing pellets of the preliminarily melt-kneaded polypropylene-based resin composition, and a method of simultaneously mixing a propylene-based block copolymer (A), a zeolite (B) and an optionally added additive in the stage of producing a polypropylene-based resin composition.

In the production of the polypropylene-based resin composition of the present invention, a mixer such as a melt extruder or a Banbury mixer may be used in the method of mixing a propylene-based block copolymer (A), a zeolite (B), optionally added additives, a resin or rubber other than the propylene-based block copolymer, and a filler and melt-mixing the mixture at 180° C. or higher.

Examples of the method of mixing a zeolite (B) include a method of preliminarily preparing a masterbatch having a high concentration within a range from 1 to 90% by weight of a zeolite (B), which is produced by melt-mixing a propylene-based block copolymer (A) with a zeolite (B), granules having a high concentration within a range from 10 to 90% by weight of a zeolite (B), which is produced by mixing a zeolite (B) with at least one kind of an additive and solidifying the mixture and mixing the masterbatch or the granules with a propylene-based block copolymer (A).

Examples of the melt-kneader used in the production of the polypropylene-based resin composition of the present invention include a single screw extruder, an co-rotating twin-screw extruder (ZSK® manufactured by Wernw Pfleideren, TEM® manufactured by TOSHIBA MACHINE CO., LTD., TEX® manufactured by The Japan Steel Works, LTD., etc.), a counter-rotating twin-screw extruder (CMP® manufactured by The Japan Steel Works, LTD., TEX®, FCM®, NCM® and LCM® manufactured by KOBE STEEL., LTD., etc.).

Examples of the shape of the polypropylene-based resin composition of the present invention include strand, sheet, flat plate, and pellet formed by cutting a strand into a proper length. From the viewpoint of production stability of the resultant molding, the composition is preferably in the form of pellets having a length of 1 to 50 mm so as to apply the polypropylene-based resin composition of the present invention for molding processing.

The molding can be obtained from the polypropylene-based resin composition of the present invention by various molding methods, and the shape and size of the resultant molding may be appropriately decided.

Examples of the method for producing a molding include injection molding, press molding, vacuum molding, foam molding, and extrusion molding, which are usually used industrially. The method further includes lamination and coextrusion in each of which the polypropyrene-based resin composition of the present invention is laminated with a polyolefin resin which is the same as that in the polypropylene-based resin composition or another type of resin according to the purposes.

The molding is preferably an injection molding, and examples of an injection molding method used for producing the molding include injection molding, injection foam molding, ultracritical injection foam molding, ultrahigh-speed injection molding, injection compression molding, gas assist injection molding, sandwich molding, sandwich foam molding, and insert-outsert molding.

Examples of the application of the molding include automotive materials, household appliance materials, building materials, bottles, containers, sheets, and films. Since the polypropylene-based resin composition of the present invention is less likely to cause emission of VOC, preferred applications include automotive interior materials, household appliance materials, and building materials (especially products existing in a person's living space).

Examples of the automotive materials include interior parts such as door trims, pillars, instrument panels, consoles, rocker panels, armrests, door panels, spare tire covers, and air bag covers; exterior parts such as bumpers, spoilers, fenders, and side steps; parts such as air intake ducts, coolant reserve tanks, fender liners, fans, and under deflectors; and integrated molded components such as front end panels.

Examples of the household appliance materials include materials for a washing machine (outer tank, inner tank, cover, pulsator, balancer, etc.), materials for a dryer, materials for a vacuum cleaner, materials for a rice cooker, materials for a pot, materials for a hotplate, materials for a dish washer, and materials for an air cleaner.

Examples of the building materials include floor members, wall members, and sash members.

EXAMPLES

The present invention will be described below by way of Examples and Comparative Examples. The additives used in the Examples and Comparative Examples are shown below.

(1) Zeolite (Component (B))
(B-1) MIZUKASIEVES® EX122 (produced by MIZUSAWA INDUSTRIAL CHEMICALS, LTD.)
Chemical name: sodium aluminosilicate
(General name: ZSM-5 zeolite powder)
Chemical formula: $Na_2O.Al_2O_3.20\text{-}45SiO_2.nH_2O$
Molar ratio $SiO_2/Al_2O_3$: 32
D50 particle diameter: 4.5 μm
(B-1s)
Small particle product of (B-1)
D50 particle diameter: 2.0 μm
(B-2) MIZUKASIEVES® H-EX122 (produced by MIZUSAWA INDUSTRIAL CHEMICALS, LTD.)
Chemical name: sodium aluminosilicate
(General name: ZSM-5 zeolite powder)
Chemical formula: $xNa_2O.Al_2O_3.20\text{-}45SiO_2.nH_2O$ ($x \leqq 0.2$)
(some sodium ions are substituted with hydrogen ion)
Molar ratio $SiO_2/Al_2O_3$: 32
D50 particle diameter: 3.7 μm
(B-3) SILTON® B (produced by MIZUSAWA INDUSTRIAL CHEMICALS, LTD.)
Chemical name: sodium aluminosilicate
(General name: A Type zeolite powder)
Chemical formula: $Na_2O.Al_2O_3.2\text{-}3SiO_2.nH_2O$
Molar ratio $SiO_2/Al_2O_3$: 2.0
D50 particle diameter: 3.5 μm
(B-4) SILTON® CPT-30 (produced by MIZUSAWA INDUSTRIAL CHEMICALS, LTD.)
Chemical name: sodium aluminosilicate
(General name: X Type zeolite powder)
Chemical formula: $Na_2O.Al_2O_3.2\text{-}3SiO_2.nH_2O$
Molar ratio $SiO_2/Al_2O_3$: 2.7
D50 particle diameter: 2.8 μm
(B-5) MIZUKASIEVES® Y-500 (produced by MIZUSAWA INDUSTRIAL CHEMICALS, LTD.)
Chemical name: sodium aluminosilicate
(General name: Y Type zeolite powder)
Chemical formula: $Na_2O.Al_2O_3.3\text{-}6SiO_2.nH_2O$
Molar ratio $SiO_2/Al_2O_3$: 5.0
D50 particle diameter: 1.2 μm
(B-6) SILTON® MT-100 (produced by MIZUSAWA INDUSTRIAL CHEMICALS, LTD.)
Chemical name: sodium aluminosilicate
(General name: ZSM-5 zeolite powder)
Chemical formula: $Na_2O.Al_2O_3.80\text{-}120SiO_2.nH_2O$
Molar ratio $SiO_2/Al_2O_3$: 110
D50 particle diameter: 3.9 μm
(B-7) High Silica Zeolite HS-20 (produced by Nippon Chemical Industrial Co., Ltd.)
Chemical name: sodium aluminosilicate
(General name: ZSM-5 zeolite powder)
Chemical formula: $Na_2O.Al_2O_3.15\text{-}25SiO_2.nH_2O$
Molar ratio $SiO_2/Al_2O_3$: 20
D50 particle diameter: 2.5 μm
(B-8) High Silica Zeolite HS-50 (produced by Nippon Chemical Industrial Co., Ltd.)
Chemical name: sodium aluminosilicate
(General name: ZSM-5 zeolite powder)
Chemical formula: $Na_2O.Al_2O_3.40\text{-}50SiO_2.nH_2O$
Molar ratio $SiO_2/Al_2O_3$: 46
D50 particle diameter: 2.9 μm
(B-9) High Silica Zeolite HS-450 (produced by Nippon Chemical Industrial Co., Ltd.)
Chemical name: sodium aluminosilicate
(General name: ZSM-5 zeolite powder)
Chemical formula: $Na_2O.Al_2O_3.470\text{-}490SiO_2.nH_2O$
Molar ratio $SiO_2/Al_2O_3$: 480
D50 particle diameter: 5.0 μm
(2) Additive (Component C)
(C-1) Calcium stearate: produced by KYODO CHEMICAL CO., LTD.
Chemical name: calcium stearate
Molecular weight: 607
(C-2) Sumilizer® GA80: produced by Sumitomo Chemical Co., Ltd.
Chemical name: 3,9-bis[2-(3-(3-tert-butyl-4-hydroxy-5-methylphenyl)propionyloxy)-1,1-dimethylethyl]-2,4,8,10-tetraoxaspiro[5.5]undecane
Molecular weight: 741
(C-3) ADK STAB® PEP-24G: produced by ADEKA CORPORATION
bis(2,4-di-tert-butylphenyl)pentaerythritol diphosphite
Molecular weight: 604
(C-4) IRGANOX® 1010: produced by Ciba Japan K.K.
Chemical name: tetrakis[methylene-3(3',5'-di-t-butyl-4-hydroxyphenyl)propionate]methane
Molecular weight: 1178
(C-5) IRGAFOS® 168: produced by Ciba Japan K.K.
Chemical name: tris(2,4-di-t-butylphenyl)phosphite
Molecular weight: 647
(C-6): Sumilizer® BHT: produced by Sumitomo Chemical Co., Ltd.
Chemical name: 2,6-di-t-butyl-4-methylphenol
Molecular weight: 220
(3) Organic Peroxide (Component D)
(D-1) PERHEXA® 25B-10: produced by NOF CORPORATION
Mixture of 10% by weight of organic peroxide and 90% by weight of polypropylene powder Physical properties of a polypropylene-based resin (component A) and a polypropylene-based resin composition were measured by the following test procedures.
(1) Melt Flow Rate (MFR, Unit: g/10 min.)
The melt flow rate was measured in accordance with the method defined in JIS K-6758 under the conditions of a temperature of 230° C. and a load of 2.16 kg.
(2) Intrinsic Viscosity ([η], Unit: dl/g)
Using an Ubbelohde type viscometer, a reduced viscosity was measured at three concentrations, 0.1, 0.2 and 0.5 g/dl. The intrinsic viscosity was determined by a calculation method described in "Polymer Solution, Polymer Experiments 11 (Kobunshi Yoeki, Kobunshi Jikkengaku 11)" (published in 1982 by KYORITSU SHUPPAN CO., LTD.), page 491, that is, an extrapolation method in which the reduced viscosity is plotted versus the concentration and the concentration is extrapolated to zero. Using tetralin as a solvent, the measurement was conducted at a temperature of 135° C. A sample was collected from a polymerization tank. In the case of the polymer component (I), the measurement was conducted using a polymer powder extracted from a polymerization tank of a first stage. The resultant intrinsic viscosity was referred to as $[\eta]_I$.

(3) Contents of Polymer Component (I) and (II), and Measurement and Calculation of Intrinsic Viscosity ($[\eta]_{Total}$, $[\eta]_I$, $[\eta]_{II}$)

From the intrinsic viscosity $[\eta]_I$ of the polymer component (I) produced in the polymerization step of the first stage, the intrinsic viscosity $[\eta]_{Total}$ of the final polymer (that is, propylene-based block copolymer (A)) produced through both polymerization steps of the first and second stages determined in accordance with the above procedure (2), and the weight ratios of the polymer component (I) and the polymer component (II) contained in the final polymer, the intrinsic viscosity $[\eta]_{II}$ of the polymer component (II) was calculated by the following equation.

$$[\eta]_{II} = ([\eta]_{Total} - [\eta]_I \times X_I)/X_{II}$$

where
$[\eta]_{Total}$: intrinsic viscosity (dl/g) of final polymer
$[\eta]_I$: intrinsic viscosity (dl/g) of polymer powder collected after polymerization step of first stage
$X_I$: weight ratio of polymer component (I) produced in polymerization step of first stage
$X_{II}$: weight ratio of polymer component (II) produced in polymerization step of second stage $X_I$ and $X_{II}$ are determined from the material balance upon polymerization.

(4) Calculation of Content (Unit: % by Weight) of Propylene-Ethylene Copolymer Component (II) of Propylene-(Propylene-Ethylene) Block Copolymer and Ethylene Content of (Unit: % by Weight) in Propylene-Ethylene Copolymer Component (II).

The contents were determined from a $^{13}$C-NMR spectrum measured under the following conditions based on a report (Macromolecules 1982, Vol. 15, pp. 1150-1152) of Kakugo et al.

In a test tube having a diameter of 10 mm, about 200 mg of a propylene-(propylene-ethylene) block copolymer was uniformly dissolved in 3 ml of a mixed solvent (ortho-dichlorobenzene/deuterated ortho-chlorobenzene=4/1 (volume ratio)) to prepare a sample and a $^{13}$C-NMR spectrum of the sample was measured under the following conditions using JNM-EX270 produced by JEOL Ltd.

Measuring temperature: 135° C.
Pulse repeating time: 10 seconds
Pulse width: 450
Multiplication time: 2,500 times (5) Content of 20° C. Xylene-Soluble Fraction (CXS(I), Unit: % by Weight)

Five grams of a sample of a polymer component (I) was completely dissolved in 500 ml of boiling xylene, and the resultant solution was cooled to 20° C. and allowed to stand for 4 hours. A 20° C. xylene-insoluble fraction was then isolated by filtration. After xylene was evaporated, the filtrate was concentrated to dryness and then dried under reduced pressure at 60° C. to obtain a 20° C. xylene-soluble fraction. The dry weight of the 20° C. xylene-soluble fraction was measured and the content of the 20° C. xylene-soluble fraction (CXS(I)) of the polymer component (I) was calculated in accordance with the following equation.

$$CXS(I) = (\text{Dry weight of } 20° \text{ C. xylene-soluble fraction}/\text{Weight of polymer component}(I)) \times 100$$

(6) Emission Amount of VOC

The emission amount of VOC was measured by the following procedure using a specimen described hereinafter.

1. The specimen was sealed into a Tedlar bag having a volume of 10 L and a pure nitrogen gas was filled therein. Then, an operation of replacing the air in the Tedlar bag by a nitrogen gas through extraction of the pure nitrogen gas was conducted twice.

2. In the Tedlar bag, 4 L of the pure nitrogen gas was filled and the cock of the Tedlar bag was closed.

The Tedlar bag was placed in an oven and a sampling Teflon® tube which extends outside the oven was attached to the tip of the cock. In this state, a heat treatment was conducted at 65° C. for 2 hours.

3. Three liters of the sample gas prepared in the above item 2 was collected in the state of heating at 65° C. in a 2,4-dinitrophenolhydrazine (DNPH) cartridge. After the collection, the cartridge was subjected to an elution treatment with acetonitrile and components eluted from the cartridge of the resultant eluate were measured using a high performance liquid chromatograph (HPLC). The components detected by the above method were VOC. The emission amount of VOC (the amount of VOC emitted from one specimen having a predetermined size, unit: μg) was calculated using a calibration curve of a standard reference material of each component. In the case where VOC was not detected, it was described as "0 (zero)".

(Production of Injection Molding)

A specimen for measuring the emission amount of VOC was made by the following procedure.

Using a NEOMAT® 350/120 type injection molding machine manufactured by Sumitomo Heavy Industries, Ltd., injection molding was conducted at a molding temperature of 220° C. and a mold cooling temperature of 50° C. to obtain a specimen measuring 150 mm in MD length×90 mm in TD length×3 mm in thickness. The specimen was cut into pieces each having an area of 72 cm$^2$ and then allowed to stand under the conditions of a temperature of 23° C. and a relative humidity of 50% for 14 days to obtain a specimen for measurement.

(7) Tensile Strength at Break (Unit: MPa)

In accordance with the method defined in ASTM D638, the tensile strength at break was measured by the same method as described in the item (6) using a specimen having a thickness of 3.2 mm under the conditions of a testing speed of 50 mm/min and a temperature of 23° C. The specimen was used after standing under the conditions of a temperature of 23° C. and a relative humidity of 50% for 2 days.

(8) Izod Impact Strength (Unit: kJ/m$^2$)

In accordance with the method defined in JIS K-7110, the Izod impact strength was measured. In the measurement, a 6.4 mm thick specimen with a notch obtained by injection molding was used. The specimen was provided with a notch after injection molding. Injection molding was conducted in the same manner as in the item (6), except that the thickness of the product was varied. The measurement was conducted at −20° C.

(9) Falling Weight Impact Strength (Unit: J)

Figure 1:
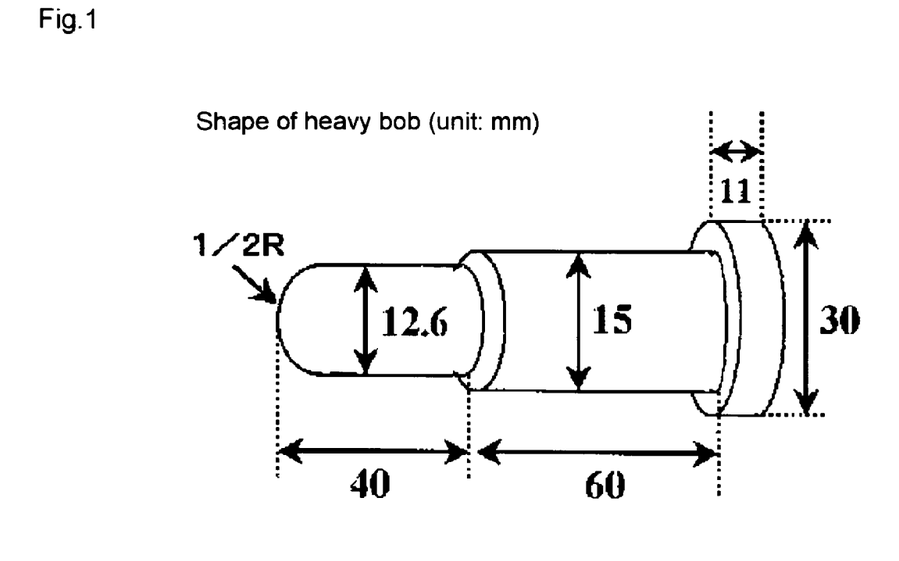
FIG. 1 is a schematic view showing a shape of an iron heavy bob used for measuring falling weight impact strength in Examples.

Using an iron heavy bob having a shape shown in FIG. 1, the falling weight impact strength (hereinafter referred to as FWI) was measured. In accordance with the measuring method defined in JIS K7211, except that the heavy bob was used, the impact energy at which half of all specimens are broken was determined. The measurement was conducted at −20° C.

A specimen for measurement obtained in the same manner as in the item (6) was used. Specifically, 20 specimens measuring 150 mm in MD length×90 mm in TD length×3 mm in thickness were made. The resultant specimens were used for measurement.

(10) Molding Processability

Molding processability of the specimen for measuring an emission amount of VOC described in the item (6) upon molding processing was evaluated. Specifically, molding processability was evaluated by measuring the weight of the resultant molding and visually observing the molding. In the case of molding under the same injection molding conditions, the amount of fill into a mold increases as the weight of the molding increases, and thus the molding with a large weight was rated good in molding processability. With respect to appearance of the molding, a specimen with less defects such as flow mark with a striped pattern and warpage was rated "Good", whereas, a specimen with remarkable defects was rated "Poor".

(11) Heat Degradation Resistance (Unit: Time)

In accordance with JIS K 7212 [General Notice of Heat Aging Resistance Test Method (Oven Method) of Thermoplastic Resin], heat degradation resistance of the specimen was evaluated. Using a gear oven manufactured by Toyo Seiki Seisaku-Sho, Ltd., heat degradation resistance was evaluated at an in-oven temperature of 150° C. The degradation time was measured until the specimen completely degraded, in other words, the time required until the tensile strength becomes zero was measured. The longer the degradation time, the better the heat degradation resistance. The specimen used for evaluation was made by press molding processing using a compression press molding machine. The conditions of molding processing and the size of the specimen are as follows.

Production of Specimen

A polypropylene-based resin composition was melted on heating in a SUS mold at a set temperature of 230° C. for 10 minutes and then cooled at a temperature of 30° C. for 5 minutes to obtain a square molding (sheet) having a thickness of 1 mm and each side of 5 cm. The resultant molding was punched to obtain a disk-shaped specimen for evaluation of heat degradation resistance, measuring 1 mm in thickness and 25 mm in diameter.

Example 1

Method for Production of Propylene-(Propylene-Ethylene) Block Copolymer (A-1)

Prepolymerization

In a SUS reactor equipped with a jacket, deaerated/dehydrated n-hexane, a solid catalyst component (A) prepared by the method descried in Example 5 of Japanese Unexamined Patent Publication (Kokai) No. 7-216017, cyclohexylethyldimethoxysilane (B) and triethylaluminum (C) were supplied so as to adjust the ratio of the amount of the component (C) to that of the component (A) to 1.67 mmol/g and to adjust the ratio of the amount of the component (B) to that of the component (C) to 0.13 mmol/mmol to prepare a prepolymerization catalyst component having a propylene prepolymerization degree of 3.5. The prepolymerization degree is defined by the number of grams of a prepolymer produced per 1 g of the solid catalyst component (A).

Regular Polymerization

Liquid Phase Polymerization

After sufficiently replacing the gas in a SUS loop type liquid phase polymerization reactor by propylene, triethylaluminum (C), cyclohexylethyldimethoxysilane (B) (ratio (B)/(C)=0.15 mol/mol) and the prepolymerization catalyst component were continuously supplied at a rate of 2.2 g/hour and the inner temperature was adjusted to 70° C. and the pressure was adjusted to 4.5 MPa using propylene and hydrogen, and then polymerization was initiated.

At the time when the polymerization degree reached 20% by weight of the entire polymerization degree, the powdered propylene homopolymer produced in the loop type liquid phase polymerization reactor was extracted and then transferred to a SUS vapor phase polymerization reactor. The vapor phase polymerization reactor is composed of three tanks.

Vapor Phase Polymerization

In the first tank, propylene was continuously supplied so as to maintain a reaction pressure of 2.1 MPa at a reaction temperature of 80° C., and then vapor phase polymerization was conducted in the presence of the propylene homopolymer component transferred from the liquid phase polymerization reactor while supplying hydrogen so as to maintain the hydrogen concentration of the vapor phase portion at 7.0 vol %.

A portion of the polymer component produced by polymerization in the first tank was intermittently transferred to the second tank and propylene was continuously supplied under the conditions maintained at a reaction temperature of 80° C. and a reaction pressure of 1.7 MPa, and then the vapor phase polymerization was continued while supplying hydrogen so as to maintain the hydrogen concentration of the vapor phase portion at 7.0 vol % to obtain a propylene homopolymer component (hereinafter referred to as a polymer component (I)).

Analytical results of the resultant polymer component (I) obtained by polymerization in the second tank revealed that the intrinsic viscosity $[\eta]_I$ was 1.07 dl/g, the isotactic pentad fraction (hereinafter mmmm fraction) was 0.983, and the content of a 20° C. xylene-soluble fraction (CXS(I)) was 0.20% by weight.

Subsequently, a portion of the polymer component (I) produced in the second tank was transferred to the third tank equipped with a jacket and then preparation of an ethylene-propylenecopolymer component (hereinafter referred to as a polymer component (II)) through polymerization of propylene and ethylene was initiated. Propylene and ethylene were continuously supplied at a ratio propylene/ethylene of 2/1 (weight ratio) so as to maintain a pressure of 1.3 MPa at a temperature of 70° C., and then the vapor phase polymerization was continued while adjusting the supply amount of hydrogen so as to maintain the hydrogen concentration of the vapor phase portion at 3.0 vol % to obtain a polymer component (II).

The powder in the third tank was intermittently introduced into a deactivation tank and the catalyst component was subjected to a deactivation treatment with water, and then the powder was dried with nitrogen at 65° C. to obtain a white powder of a propylene-(propylene-ethylene) block copolymer (A-1).

The resultant propylene-(propylene-ethylene) block copolymer (A-1) had an intrinsic viscosity $[\eta]_{Total}$ of 1.4 dl/g and an ethylene content of 7.0% by weight. The weight ratio of the polymer component (I) to the polymer component (II) was 80/20. This ratio was calculated from the weight of the finally obtained propylene-(propylene-ethylene) block copolymer and the amount of the polymer component (I). Therefore, the content of ethylene in the polymer component (II) was 35% by weight and the intrinsic viscosity $[\eta]_{II}$ of the polymer component (II) was 2.7 dl/g.

Granulation (Melt-Kneading, Filtration)

One hundred parts by weight of a powder of the resultant propylene-(propylene-ethylene) block copolymer (A-1), 0.05 part by weight each of additives C-1, C-2 and C-3, 0.05 part by weight of a zeolite (B-1) and 0.2 part by weight of an organic peroxide (D-1) were mixed using a mixer and the resultant mixture was melt-kneaded using a single screw extruder (manufactured by TANABE PLASTICS MACHINERY CO., LTD., barrel inner diameter: 40 mm, screw revolution number: 100 rpm, cylinder temperature: 200 to 210° C.). The resultant melt-kneaded mixture was transferred to a twin-screw kneader, filtered through a woven wire mesh filter (50 mesh, opening size: 410 μm) mounted to a die portion inlet of the kneader and then extruded through the die portion. The extrudate was solidified with cold water while cooling and then cut to obtain pellets of the polypropylene-based resin composition. The extrusion rate was 18 kg/hour. The MFR (measuring temperature: 230° C.) of the pellets of the polypropylene-based resin composition was 50.1 g/10 min.

Production of Molding

Using the resultant pellets, an injection molding was produced and the emission amount of VOC was measured. The evaluation results are shown in Table 1.

Examples 2 and 3

In the same manner as in Example 1, except that the amount of the zeolite (B-1) was varied as shown in Table 1, the operation was conducted. The evaluation results are shown in Table 1.

Examples 4 to 6

In the same manner as in Example 1, except that a zeolite (B-2) was used in the amount shown in Table 2 in place of 0.05 part by weight of the zeolite (B-1), the operation was conducted. The evaluation results are shown in Table 2.

Comparative Example 1

In the same manner as in Example 1, except that the zeolite (B-1) was not mixed, the operation was conducted. The evaluation results are shown in Table 3.

Comparative Examples 2 to 4

In the same manner as in Example 1, except that a zeolite (B-3, B-4, or B-5) was used in the amount shown in Table 3 in place of 0.05 part by weight of the zeolite (B-1), the operation was conducted. The evaluation results are shown in Table 3.

Comparative Example 5

In the same manner as in Example 1, except that 0.4 parts by weight of a zeolite (B-6) was used in place of 0.05 part by weight of the zeolite (B-1), the operation was conducted. The evaluation results are shown in Table 3.

TABLE 1

| | | Example 1 | Example 2 | Example 3 |
|---|---|---|---|---|
| Composition | Component A | A-1 | A-1 | A-1 |
| | (Parts by weight) | 100 | 100 | 100 |
| | Component B | B-1 | B-1 | B-1 |
| | Type of zeolite | ZSM-5 | ZSM-5 | ZSM-5 |
| | (Part by weight) | 0.05 | 0.1 | 0.4 |
| VOC | Formaldehyde (μg) | 0 | 0 | 0 |
| | Acetaldehyde (μg) | 0.33 | 0.20 | 0.09 |
| MFR (g/10 min.) | | 50.1 | 53.6 | 50.9 |

[Common Formulation]
Component C: C-1/C-2/C-3:0.05/0.05/0.05 (Part by weight)
Component D: D-1:0.02 (Part by weight)

TABLE 2

| | | Example 4 | Example 5 | Example 6 |
|---|---|---|---|---|
| Composition | Component A | A-1 | A-1 | A-1 |
| | (Parts by weight) | 100 | 100 | 100 |
| | Component B | B-2 | B-2 | B-2 |
| | Type of zeolite | ZSM-5 | ZSM-5 | ZSM-5 |
| | (Part by weight) | 0.05 | 0.1 | 0.4 |
| VOC | Formaldehyde (μg) | 0 | 0 | 0 |
| | Acetaldehyde (μg) | 0.05 | 0 | 0 |
| MFR (g/10 min.) | | 50.0 | 50.2 | 48.3 |

[Common Formulation]
Component C: C-1/C-2/C-3:0.05/0.05/0.05 (Part by weight)
Component D: D-1:0.02 (Part by weight)

TABLE 3

| | | Comparative Example 1 | Comparative Example 2 | Comparative Example 3 | Comparative Example 4 | Comparative Example 5 |
|---|---|---|---|---|---|---|
| Composition | Component A | A-1 | A-1 | A-1 | A-1 | A-1 |
| | (Parts by weight) | 100 | 100 | 100 | 100 | 100 |
| | Component B | 0 | B-3 | B-4 | B-5 | B-6 |
| | Type of zeolite | | A | X | Y | ZSM-5 |
| | (Part by weight) | | 0.05 | 0.05 | 0.05 | 0.4 |
| VOC | Formaldehyde (μg) | 0.14 | 0.08 | 0.19 | 0.16 | 0.04 |
| | Acetaldehyde (μg) | 0.30 | 0.26 | 0.41 | 0.43 | 0.14 |
| MFR (g/10 min.) | | 49.0 | 49.3 | 49.2 | 50.1 | 51.3 |

[Common Formulation]
Component C: C-1/C-2/C-3:0.05/0.05/0.05 (Part by weight)
Component D: D-1:0.02 (Part by weight)

Example 7

Method for Production of Propylene-(Propylene-Ethylene) Block Copolymer (A-5)

Prepolymerization

In a SUS reactor equipped with a jacket, deaerated/dehydrated n-hexane, a solid catalyst component (A) prepared by the method described in Example 5 of Japanese Unexamined Patent Publication (Kokai) No. 7-216017, cyclohexylethyldimethoxysilane (B) and triethylaluminum (C) were supplied so as to adjust the ratio of the amount of the component (C) to that of the component (A) to 6.0 mmol/g and to adjust the ratio of the amount of the component (B) to that of the component (C) to 0.1 mmol/mmol to prepare a prepolymerization catalyst component having a propylene prepolymerization degree of 2.0. The prepolymerization degree is defined by the number of grams of a prepolymer produced per 1 g of the solid catalyst component (A).

Regular Polymerization

Liquid Phase Polymerization

After sufficiently replacing the gas in a SUS loop type liquid phase polymerization reactor by propylene, triethylaluminum (C), cyclohexylethyldimethoxysilane (B) (ratio (B)/(C)=0.15 mol/mol) and the prepolymerization catalyst component were continuously supplied at a rate of 2.025 g/hour and also propylene was supplied at a rate of 25 kg/hour and hydrogen was supplied at a rate of 215 NL/hour while adjusting the inner temperature to 70° C. and the pressure to 4.5 MPa through supply of propylene and hydrogen, and then polymerization was initiated.

At the time when the polymerization degree reached 13.7% by weight of the entire polymerization degree, the powdered propylene homopolymer produced in the loop type liquid phase polymerization reactor was extracted and then transferred to a SUS vapor phase polymerization reactor. The vapor phase polymerization reactor is composed of two tanks.

Vapor Phase Polymerization

In the first tank, propylene was continuously supplied so as to maintain a reaction pressure of 1.8 MPa at a reaction temperature of 80° C., and then vapor phase polymerization was conducted in the presence of the powdered propylene homopolymer component transferred from the liquid phase polymerization reactor while supplying hydrogen so as to maintain the hydrogen concentration of the vapor phase portion at 10.6 vol % to obtain a propylene homopolymer component (hereinafter referred to as a polymer component (I)).

Analytical results of the resultant polymer component (I) obtained by polymerization in the first tank revealed that the intrinsic viscosity $[\eta]_I$ was 0.93 dl/g, the mmmm fraction was 0.980, and the content of a 20° C. xylene-soluble fraction (CXS(I)) was 0.25% by weight.

Subsequently, a portion of the polymer component (I) produced in the first tank was transferred to the second tank and then preparation of an ethylene-propylene copolymer component (hereinafter referred to as a polymer component (II)) through polymerization of propylene and ethylene was initiated. Propylene and ethylene were continuously supplied at a ratio propylene/ethylene of 2.19/1 (weight ratio) so as to maintain a pressure of 1.4 MPa at a temperature of 70° C., and then the vapor phase polymerization was continued while adjusting the concentration of mixed gas so as to maintain the hydrogen concentration of the vapor phase portion at 0.88 vol % and to maintain the ethylene concentration at 27.3 vol % to obtain a polymer component (II).

The powder in the second tank was intermittently introduced into a deactivation tank and the catalyst component was subjected to a deactivation treatment with water, and then the powder was dried with nitrogen at 65° C. to obtain a white powder of a propylene-(propylene-ethylene) block copolymer (A-5).

The resultant propylene-(propylene-ethylene) block copolymer (A-5) had an intrinsic viscosity $[\eta]_{Total}$ of 1.87 dl/g and an ethylene content of 9.7% by weight. The weight ratio of the polymer component (I) to the polymer component (II) was 69.3/30.7. This ratio was calculated from the weight of the finally obtained propylene-(propylene-ethylene) block copolymer and the amount of the polymer component (I). Therefore, the content of ethylene in the polymer component (II) was 31.6% by weight and the intrinsic viscosity $[\eta]_{II}$ of the polymer component (II) was 3.99 dl/g.

Granulation (Melt-Kneading, Filtration)

One hundred parts by weight of a powder of the resultant propylene-(propylene-ethylene) block copolymer (A-5), 0.05 part by weight of the additive C-1, 0.1 parts by weight of the additive C-2, 0.1 part by weight of the additive C-3 and 0.05 part by weight of a zeolite (B-1s) were mixed using a mixer and the resultant mixture was melt-kneaded using a co-rotating twin-screw extruder (manufactured by TECHNOVEL CORPORATION, Model: KZW15-45MG, barrel inner diameter: 15 mm, screw revolution number: 300 rpm, cylinder set temperature: 200° C., extrusion rate: 6 to 7 kg/hr). The resultant melt-kneaded mixture was filtered through a sintered wire mesh filter (FINEPORE NF13D manufactured by Nippon Seisen Co., Ltd., opening size: 60 μm) mounted to a die portion inlet of the kneader and then extruded through the die portion. The extrudate was solidified with cold water while cooling and then cut to obtain pellets of the polypropylene-based resin composition. The MFR (measuring temperature: 230° C.) of the pellets of the polypropylene-based resin composition was 12 g/10 min.

Production of Molding

Using the resultant pellets, a specimen for evaluation of VOC was made in the same manner as described above using an injection molding machine. The weight of the resulting specimen was 34.8 g and there was no abnormality in appearance. Also, the emission amount of VOC of the specimen was measured. Furthermore, a specimen for evaluation of mechanical properties was made from the pellets and physical properties were evaluated. The valuation results are shown in Table 4.

Example 8

In the same manner as in Example 7, except that a block copolymer (A-1) was used in place of the propylene-(propylene-ethylene) block copolymer (A-5), the operation was conducted. Various properties were also evaluated in the same manner as in Example 7. The evaluation results are shown in Table 4 and Table 5.

Example 9

In the same manner as in Example 7, except that a propylene-(propylene-ethylene) block copolymer (A-1) was used in place of the propylene-(propylene-ethylene) block copolymer (A-5) and 0.02 part by weight of an organic peroxide (D-1) was added upon granulation, the operation was conducted. Various properties were also evaluated in the same manner as in Example 7. The evaluation results are shown in Table 4 and Table 5.

Examples 10 to 13

In the same manner as in Example 9, except that block copolymers shown in Table 4 were used in place of the propylene-(propylene-ethylene) block copolymer (A-1), the operation was conducted. Each propylene-(propylene-ethylene) block copolymer was produced by varying polymerization conditions so as to obtain the structure and physical properties of each propylene-(propylene-ethylene) block copolymer described in Table 4 in the Method for Production of a Propylene-(propylene-ethylene Block Copolymer (A-5) described in Example 7. Various properties were also evaluated in the same manner as in Example 7. The evaluation results are shown in Table 4 and Table 5.

Comparative Example 6

In the same manner as in Example 9, except that a propylene homopolymer (A-7) described in Table 4 was used in place of the propylene-(propylene-ethylene) block copolymer (A-1), the operation was conducted. The results are shown in Table 4 and Table 5. The propylene homocopolymer (A-7) was produced by continuously performing homopolymerization of propylene without using ethylene under the same conditions as in the polymerization step of the second tank in the polymerization step of the third tank in the vapor phase polymerization stage in the method for production of a propylene-(propylene-ethylene) block copolymer (A-1) described in Example 1, and adjusting the hydrogen concentration of each tank (liquid phase polymerization stage, vapor phase polymerization stage) so as to obtain those described in Table 4. Various properties were also evaluated in the same manner as in Example 7. The evaluation results are shown in Table 4 and Table 5.

Example 14

In the same manner as in Example 7, except that a block copolymer (A-1) was used in place of the propylene-(propylene-ethylene) block copolymer (A-5) and the cylinder setting temperature of the twin-screw kneader in the granulation step was varied to 230° C., the operation was conducted. Various properties were also evaluated in the same manner as in Example 7. The evaluation results are shown in Table 4 and Table 6.

Comparative Examples 7 to 8

In the same manner as in Example 14, except that a block copolymer (A-6) having a large intrinsic viscosity $[\eta]_I$ of the polymer component (I) was used in place of the propylene-(propylene-ethylene) block copolymer (A-1), zeolite (B-7) was used in place of the zeolite (B-1s) (in Comparative Example 7) and the amount of the organic peroxide (D-1) was varied as shown in Table 6, the operation was conducted. The production of the propylene-(propylene-ethylene) block copolymer (A-6) is shown below. Various properties were also evaluated in the same manner as in Example 7. The evaluation results are shown in Table 4 and Table 6.

Prepolymerization

In a SUS reactor equipped with a jacket, deaerated/dehydrated n-hexane, a solid catalyst component (A) prepared by the method descried in Example 5 of Japanese Unexamined Patent Publication (Kokai) No. 7-216017, cyclohexylethyldimethoxysilane (B) and triethylaluminum (C) were supplied so as to adjust the ratio of the amount of the component (C) to that of the component (A) to 5.5 mmol/g and to adjust the ratio of the amount of the component (B) to that of the component (C) to 0.1 mmol/mmol to prepare a prepolymerization catalyst component having a propylene prepolymerization degree of 2.0. The prepolymerization degree is defined by the number of grams of a prepolymer produced per 1 g of the solid catalyst component (A).

Regular Polymerization

Liquid Phase Polymerization

After sufficiently replacing a gas in a SUS loop type liquid phase polymerization reactor comprising three tanks arranged in series by propylene, triethylaluminum (C), cyclohexylethyldimethoxysilane (B) (ratio (B)/(C)=0.151 mol/mol) and the prepolymerization catalyst component were continuously supplied in the first tank at a rate of 1.8 g/hour and also propylene was supplied at a rate of 25 kg/hour and hydrogen was supplied at a rate of 20 NL/hour while maintaining the inner temperature at 73° C. and the pressure at 4.7 MPa through supply of propylene and hydrogen, and then polymerization was initiated.

At the time when the polymerization degree reached 7.5% by weight of the entire polymerization degree, the propylene homopolymer produced in the first tank of the loop type liquid phase polymerization reactor was extracted and then transferred to a second tank of the SUS loop type liquid phase polymerization reactor, and also propylene was supplied at a rate of 15 kg/hour and hydrogen was supplied at a rate of 11 NL/hour while adjusting the inner temperature to 70° C. and the pressure to 4.5 MPa through supply of propylene and hydrogen, and then homopolymerization was conducted.

At the time when the polymerization degree reached 14.8% by weight of the entire polymerization degree, the powdered propylene homopolymer produced in the second tank of the loop type liquid phase polymerization reactor was extracted and then transferred to the third tank of SUS loop type liquid phase polymerization reactor, and also propylene homopolymerization was conducted while maintaining the inner temperature at 68° C. and the pressure at 4.3 MPa through supply of propylene and hydrogen.

At the time when the polymerization degree reached 20% by weight of the entire polymerization degree, the powdered propylene homopolymer produced in the third tank of the loop type liquid phase polymerization reactor was extracted and then transferred to a SUS vapor phase polymerization reactor.

The vapor phase polymerization reactor is composed of two tanks.

Vapor Phase Polymerization

In the first tank, propylene was continuously supplied so as to maintain a reaction pressure of 1.8 MPa at a reaction temperature of 80° C., and then vapor phase polymerization was conducted in the presence of the propylene homopolymer component transferred from the liquid phase polymerization reactor while supplying hydrogen so as to maintain the hydrogen concentration of the vapor phase portion at 1.0 vol % to obtain a propylene homopolymer component (hereinafter referred to as a polymer component (I)).

Analytical results of the resultant polymer component (I) obtained by polymerization in the second tank revealed that the intrinsic viscosity $[\eta]_I$ was 1.84 dl/g, the mmmm fraction was 0.983, and the content of a 20° C. xylene-soluble fraction (CXS(I)) was 0.27% by weight.

Subsequently, a portion of the polymer component (I) produced in the first tank was transferred to the second tank and then preparation of an ethylene-propylene copolymer component (hereinafter referred to as a polymer component (II)) through polymerization of propylene and ethylene was initiated. Propylene and ethylene were continuously supplied at a ratio propylene/ethylene of 1.35/1 (weight ratio) so as to maintain a pressure of 1.4 MPa at a temperature of 70° C., and then the vapor phase polymerization was continued while adjusting the supply amount of hydrogen so as to adjust the hydrogen concentration of the vapor phase portion at 2.0 vol % and to adjust the ethylene concentration at 33.1 vol % to obtain a polymer component (II).

The powder in the second tank was intermittently introduced into a deactivation tank and the catalyst component was subjected to a deactivation treatment with water, and then the powder was dried with nitrogen at 65° C. to obtain a white powder of a propylene-(propylene-ethylene) block copolymer (A-6).

The resultant propylene-(propylene-ethylene) block copolymer (A-6) had an intrinsic viscosity $[\eta]_{Total}$ of 2.71 dl/g and an ethylene content of 8.3% by weight. The weight ratio of the polymer component (I) to the polymer component (II) was 78.2/21.8. This ratio was calculated from the weight of the finally obtained propylene-(propylene-ethylene) block copolymer and the amount of the polymer component (I).

Therefore, the content of ethylene in the polymer component (II) was 38.1% by weight and the intrinsic viscosity $[\eta]_{II}$ of the polymer component (II) was 2.71 dl/g.

Examples 15 to 16

Comparative Example 9

In the same manner as in Example 7, except that a block copolymer (A-1) was used in place of the propylene-(propylene-ethylene) block copolymer (A-5), 0.02 part by weight of an organic peroxide (D-1) was added upon granulation, and a zeolite described in Table 7 was used in place of the zeolite (B-1s), the operation was conducted. Various properties were also evaluated in the same manner as in Example 7. The evaluation results are shown in Table 7.

Examples 17 to 21

In the same manner as in Example 9, except that the additive (antioxidant) and the amount were varied as described in Table 8, the operation was conducted. Various properties were also evaluated in the same manner as in Example 9. The evaluation results are shown in Table 8.

TABLE 4

|  |  | A-1 | A-2 | A-3 | A-4 | A-5 | A-6 | A-7 |
|---|---|---|---|---|---|---|---|---|
| Component (I) | Component (I) Content (% by weight) | 80.0 | 83.5 | 77.2 | 72.1 | 69.3 | 78.2 | 100 |
|  | $[\eta]_I$ (dl/g) | 1.07 | 1.02 | 0.93 | 0.93 | 0.93 | 1.84 | 0.92 |
|  | CXS (% by weight) | 0.20 | 0.22 | 0.25 | 0.25 | 0.25 | 0.27 | 0.25 |
| component (II) | Component (II) Content (% by weight) | 20.0 | 16.5 | 22.8 | 27.9 | 30.7 | 21.8 | 0 |
|  | $[\eta]_{II}$ (dl/g) | 2.70 | 4.04 | 4.18 | 4.09 | 3.99 | 2.71 | — |
|  | Ethylene Content (% by weight) | 35.0 | 33.9 | 32.9 | 32.7 | 31.5 | 38.1 | — |
|  | $[\eta]_{II}/[\eta]_I$ | 2.52 | 3.96 | 4.49 | 4.40 | 4.29 | 1.47 | — |
| Entire polymer | $[\eta]_{Total}$ (dl/g) | 1.40 | 1.52 | 1.67 | 1.81 | 1.87 | 2.71 | $[\eta]_I$ |
|  | Ethylene Content (% by weight) | 7.0 | 5.6 | 7.5 | 9.1 | 9.7 | 8.3 | — |

TABLE 5

|  |  | Example 7 | Example 8 | Example 9 | Example 10 | Example 11 | Example 12 | Example 13 | Comparative Example 6 |
|---|---|---|---|---|---|---|---|---|---|
| Composition | component A | A-5 | A-1 | A-1 | A-2 | A-3 | A-4 | A-5 | A-7 |
|  | (Parts by weight) | 100 | 100 | 100 | 100 | 100 | 100 | 100 | 100 |
|  | component B | B-1s | B-1s | B-1s | B-1s | B-1s | B-1s | B-1s | B-1s |
|  | Type of zeolite | ZSM-5 | ZSM-5 | ZSM-5 | ZSM-5 | ZSM-5 | ZSM-5 | ZSM-5 | ZSM-5 |
|  | (Part by weight) | 0.1 | 0.1 | 0.1 | 0.1 | 0.1 | 0.1 | 0.1 | 0.1 |
|  | Component D | 0 | 0 | D-1 | D-1 | D-1 | D-1 | D-1 | D-1 |
|  | (Part by weight) |  |  | 0.02 | 0.02 | 0.02 | 0.02 | 0.02 | 0.02 |
| VOC | Formaldehyde (µg) | 0.06 | 0.05 | 0 | 0 | 0 | 0 | 0 | 0 |
|  | Acetaldehyde (µg) | 0 | 0.06 | 0 | 0 | 0.08 | 0.10 | 0.05 | 0 |
| Mechanical properties | Tensile strength at break (MPa) | 23 | 19 | 18 | 19 | 16 | 21 | 22 | 34 |
|  | Izod impact strength (KJ/m²) | 10.4 | 4.3 | 3.9 | 3.3 | 5.0 | 8.7 | 10 | 1.5 |
|  | FWI (J · m) | 31 | 33 | 36 | 20 | 32 | 32 | 33 | <1 |
| Fluidity | MFR (g/10 min.) | 12 | 27 | 29 | 28 | 37 | 16 | 14 | 111 |
| Molding processability | Weight of molding (g/specimen) | 34.8 | 35.0 | 35.1 | 35.1 | 35.2 | 35.0 | 35.0 | 35.2 |
|  | Appearance of molding | Good | Good | Good | Good | Good | Good | Good | Good |

[Common formulation]
Component C: C-1/C-2/C-3:0.05/0.1/0.1 (Part by weight)

TABLE 6

|  |  | Example 14 | Comparative Example 7 | Comparative Example 8 |
|---|---|---|---|---|
| Composition | Component A | A-1 | A-6 | A-6 |
|  | (Parts by weight) | 100 | 100 | 100 |
|  | $[\eta]_I$ (dl/g) | 1.07 | 1.84 | 1.84 |
|  | $[\eta]_{II}$ (dl/g) | 2.70 | 2.71 | 2.71 |
|  | Component (II) Content | 20.0 | 21.8 | 21.8 |
|  | Component B | B-1s | B-7 | B-1s |

TABLE 6-continued

|  |  | Example 14 | Comparative Example 7 | Comparative Example 8 |
|---|---|---|---|---|
|  | Type of zeolite | ZSM-5 | ZSM-5 | ZSM-5 |
|  | (Part by weight) | 0.1 | 0.1 | 0.1 |
|  | Component D | 0 | 0 | D-1 |
|  | (Parts by weight) |  |  | 1.0 |
| VOC | Formaldehyde (μg) | 0 | 0 | 0.18 |
|  | Acetaldehyde (μg) | 0 | 0.05 | 0.33 |
| Mechanical properties | Tensile strength at break (MPa) | 22 | 25 | 16 |
|  | Izod impact strength (KJ/m$^2$) | 3.7 | 7.6 | 4.9 |
|  | FWI (J · m) | 37 | 39 | 34 |
| Fluidity | MFR (g/10 min.) | 25 | 2.5 | 39 |
| Molding processability | Weight of molding (g/specimen) | 34.9 | 34.5 | 35.5 |
|  | Appearance of molding | Good | Poor | Good |

[Common formulation]
Component C: C-1/C-2/C-3:0.05/0.1/0.1 (Part by weight)

TABLE 7

|  |  | Example 9 | Example 15 | Example 16 | Comparative Example 9 |
|---|---|---|---|---|---|
| Composition | Component A | A-1 | A-1 | A-1 | A-1 |
|  | (Parts by weight) | 100 | 100 | 100 | 100 |
|  | Component B | B-1s | B-7 | B-8 | B-9 |
|  | Type of zeolite | ZSM-5 | ZSM-5 | ZSM-5 | ZSM-5 |
|  | Ratio SiO$_2$/Al$_2$O$_3$ | 32 | 20 | 46 | 480 |
|  | (Part by weight) | 0.1 | 0.1 | 0.1 | 0.1 |
|  | Component D | D-1 | D-1 | D-1 | D-1 |
|  | (Part by weight) | 0.02 | 0.02 | 0.02 | 0.02 |
| VOC | Formaldehyde (μg) | 0 | 0 | 0 | 0.10 |
|  | Acetaldehyde (μg) | 0 | 0 | 0 | 0.18 |
| Mechanical properties | Tensile strength at break (MPa) | 18 | 19 | 18 | 18 |
|  | Izod impact strength (KJ/m$^2$) | 3.9 | 4.2 | 4.3 | 3.8 |
|  | FWI (J · m) | 36 | 33 | 35 | 32 |
| Fluidity | MFR (g/10 min.) | 29 | 27 | 28 | 29 |
| Molding processability | Weight of molding (g/specimen) | 35.1 | 35.1 | 35.1 | 35.1 |
|  | Appearance of molding | Good | Good | Good | Good |
| Heat degradation resistance | Deterioration time (hours) | 540 | 520 | 500 | 500 |

[Common formulation]
Component C: C-1/C-2/C-3:0.05/0.1/0.1 (Part by weight)

TABLE 8

|  |  | Example 17 | Example 18 | Example 19 | Example 20 | Example 21 |
|---|---|---|---|---|---|---|
| Composition | Component A | A-1 | A-1 | A-1 | A-1 | A-1 |
|  | (Parts by weight) | 100 | 100 | 100 | 100 | 100 |
|  | Component B | B-1s | B-1s | B-1s | B-1s | B-1s |
|  | Type of zeolite | ZSM-5 | ZSM-5 | ZSM-5 | ZSM-5 | ZSM-5 |
|  | (Parts by weight) | 0.1 | 0.1 | 0.1 | 0.1 | 0.1 |
|  | Neutralizer | C-1 | C-1 | C-1 | C-1 | C-1 |
|  | (Part by weight) | 0.1 | 0.1 | 0.1 | 0.1 | 0.1 |
|  | Phenol-based antioxidant | C-4 | C-4 | C-6 | C-6 | C-6 |
|  | (Part by weight) | 0.1 | 0.1 | 0.1 | 0.1 | 0.1 |
|  |  |  |  |  |  | C-4 |
|  |  |  |  |  |  | 0.1 |
|  | Phosphorous-based antioxidant | C-3 | C-5 | C-3 | C-5 | 0 |
|  | (Part by weight) | 0.1 | 0.1 | 0.1 | 0.1 |  |
|  | Component D | D-1 | D-1 | D-1 | D-1 | D-1 |
|  | (Part by weight) | 0.02 | 0.02 | 0.02 | 0.02 | 0.02 |
| VOC | Formaldehyde (μg) | 0 | 0 | 0 | 0 | 0 |
|  | Acetaldehyde (μg) | 0 | 0 | 0 | 0.1 | 0 |

TABLE 8-continued

| | | Example 17 | Example 18 | Example 19 | Example 20 | Example 21 |
|---|---|---|---|---|---|---|
| Mechanical properties | Tensile strength at break (MPa) | 18 | 18 | 18 | 17 | 19 |
| | Izod impact strength (KJ/m$^2$) | 4.4 | 4.2 | 3.5 | 4.3 | 4.2 |
| | FWI (J · m) | 31 | 34 | 34 | 33 | 33 |
| Fluidity | MFR (g/10 min.) | 28 | 31 | 28 | 31 | 29 |
| Molding processability | Weight of molding (g/specimen) | 35.1 | 35.1 | 35.0 | 35.1 | 35.1 |
| | Appearance of molding | Good | Good | Good | Good | Good |
| Heat degradation resistance | Deterioration time (hours) | >600 | 370 | 70 | 70 | 350 |

C-3: ADK STAB ® PEP-24G, C-4: IRGANOX ® 1010
C-5: IRGAFOS ® 168, C-6: Sumilizer ® BHT In Examples 1 to 6, formaldehyde was not detected and a small amount of acetaldehyde was emitted. In contrast, in both Comparative Example 1 containing no zeolite mixed therein and Comparative Examples 2 to 5 containing a zeolite which does not satisfy features of the present invention, both formaldehyde and acetaldehyde were emitted in a large amount.

In Examples 7 to 14, formaldehyde and acetaldehyde were emitted in a small amount or not detected, and the products were excellent in mechanical characteristics, fluidity and molding processability. In contrast, Comparative Example 6 containing a propylene homopolymer which does not satisfy features of the present invention, the product was inferior in Izod impact strength and FWI. In Comparative Example 7 containing a propylene-based block copolymer which does not satisfy features of the present invention, the product was inferior in fluidity and molding processability, and flow mark with a striped pattern was observed on the molding surface. In Comparative Example 8 in which fluidity was enhanced by mixing a propylene-based block copolymer, which does not satisfy features of the present invention, with an organic peroxide, both formaldehyde and acetaldehyde were emitted in a large amount.

In Examples 9, 15 and 16, neither formaldehyde nor acetaldehyde was detected and the products were excellent in mechanical characteristics, fluidity and molding processability. In contrast, Comparative Example 9 containing a zeolite which does not satisfy features of the present invention, both formaldehyde and acetaldehyde were emitted in a large amount.

In Examples 17 to 21, formaldehyde and acetaldehyde were emitted in a small amount or not detected, and the products were excellent in mechanical characteristics and molding processability.

According to the present invention, there can be obtained a polypropylene-based resin composition which suppresses emission of VOC and is also excellent in tensile strength, impact strength and molding processability, and a molding which suppresses emission of VOC and is also excellent in tensile strength.

What is claimed is:
1. A polypropylene-based resin composition comprising a propylene-based block copolymer (A) which satisfies features (a), (b) and (c) shown below and has a melt flow rate of from 5 to 100 g/10 min, measured at a temperature of 230° C. and a load of 2.16 kgf, and
a zeolite (B) being a compound represented by the formula (I):

$$xM_{2/n}O.Al_2O_3.ySiO_2.zH_2O$$

wherein M represents an element of Group IA or IIA of the Periodic Table, n represents an atomic value of M, x represents a number more than 0, y represents a number of 20 to 60, and z represents a number of 0 to 7, the zeolite (B) having a molar ratio $SiO_2/Al_2O_3$ of 20 to 60 and having a crystalline structure called ZSM-5 type, in an amount of 0.01 to 0.4 part by weight based on 100 parts by weight of the propylene-based block copolymer (A):

Feature (a): the propylene-based block copolymer (A) is a propylene-based block copolymer containing a polymer component (I) and a polymer component (II), wherein the polymer component (I) is a propylene-based polymer having an intrinsic viscosity ($[\eta]_I$) measured in tetralin at 135° C. of 0.1 to 1.5 (dl/g), and the polymer component (II) is a propylene-based copolymer having units derived from at least one kind of comonomer selected from the group consisting of ethylene and α-olefins having 4 to 12 carbon atoms and units derived from propylene, which copolymer has an intrinsic viscosity ($[\eta]_{II}$) measured in tetralin at 135° C. of 1 to 20 (dl/g);

Feature (b): the polymer component (II) has a content of the units derived from at least one kind of comonomer selected from the group consisting of ethylene and α-olefins having 4 to 12 carbon atoms of from 1 to 80% by weight; and Feature (c): the propylene-based block copolymer (A) has a content of the polymer component (II) of from 5 to 70% by weight.

2. The polypropylene-based resin composition according to claim 1, wherein the zeolite (B) is a compound represented by the formula (II):

$$xNa_2O.Al_2O_3.ySiO_2.zH_2O$$

wherein x represents a number of 0 to 1, y represents a number of 20 to 50, and z represents a number of 0 to 7.

3. The polypropylene-based resin composition according to claim 1, wherein a ratio of the intrinsic viscosity ($[\eta]_{II}$) of the polymer component (II) to the intrinsic viscosity ($[\eta]_I$) of the polymer component (I) is from 1 to 20, and the content of the polymer component (II) of the propylene-based block copolymer (A) is from 10 to 50% by weight.

4. The polypropylene-based resin composition according to claim 1, which further comprises a phenol-based antioxidant having a molecular weight of 300 or more and/or a phosphorous-based antioxidant having a molecular weight of 300 or more in an amount of 0.01 to 1 part by weight based on 100 parts by weight of the propylene-based block copolymer (A).

5. A method for producing the polypropylene-based resin composition according to claim 1, which comprises a step of melt-mixing 100 parts by weight of a propylene-based block copolymer (A), 0.01 to 0.4 part by weight of a zeolite (B) and 0.0001 to 1 part by weight of an organic peroxide (C).

6. A molding formed from the polypropylene-based resin composition according to claim 1.

7. The polypropylene-based resin composition according to claim 1, wherein a ratio of the intrinsic viscosity ($[\eta]_{II}$) of the polymer component (II) to the intrinsic viscosity ($[\eta]_{I}$) of the polymer component (I) is from 1 to 20, and the content of the polymer component (II) of the propylene-based block copolymer (A) is from 10 to 50% by weight.

8. The polypropylene-based resin composition according to claim 2, wherein a ratio of the intrinsic viscosity ($[\eta]_{II}$) of the polymer component (II) to the intrinsic viscosity ($[\eta]_{I}$) of the polymer component (I) is from 1 to 20, and the content of the polymer component (II) of the propylene-based block copolymer (A) is from 10 to 50% by weight.

9. The polypropylene-based resin composition according to claim 1, which further comprises a phenol-based antioxidant having a molecular weight of 300 or more and/or a phosphorous-based antioxidant having a molecular weight of 300 or more in an amount of 0.01 to 1 part by weight based on 100 parts by weight of the propylene-based block copolymer (A).

10. The polypropylene-based resin composition according to claim 2, which further comprises a phenol-based antioxidant having a molecular weight of 300 or more and/or a phosphorous-based antioxidant having a molecular weight of 300 or more in an amount of 0.01 to 1 part by weight based on 100 parts by weight of the propylene-based block copolymer (A).

11. The polypropylene-based resin composition according to claim 3, which further comprises a phenol-based antioxidant having a molecular weight of 300 or more and/or a phosphorous-based antioxidant having a molecular weight of 300 or more in an amount of 0.01 to 1 part by weight based on 100 parts by weight of the propylene-based block copolymer (A).

12. A molding formed from the polypropylene-based resin composition according to claim 1.

13. A molding formed from the polypropylene-based resin composition according to claim 2.

14. A molding formed from the polypropylene-based resin composition according to claim 3.

15. A molding formed from the polypropylene-based resin composition according to claim 4.

* * * * *